(12) United States Patent  
Maruyama et al.

(10) Patent No.: US 6,994,268 B2  
(45) Date of Patent: Feb. 7, 2006

(54) HEAT ACCUMULATOR FOR VEHICLE USE

(75) Inventors: Kenichi Maruyama, Hekinan (JP); Kazuya Murata, Kuwana (JP); Koichi Ban, Tokai (JP); Toshio Morikawa, Toyota (JP); Shigetaka Yoshikawa, Nishikamo-gun (JP); Eiichi Ueda, Kadoma (JP)

(73) Assignees: DENSO Corporation, Kariya (JP); Toyota Jidosha Kabushiki Kaisha, Toyota (JP); Tiger Corporation, Osaka (JP)

( * ) Notice: Subject to any disclaimer, the term of this patent is extended or adjusted under 35 U.S.C. 154(b) by 136 days.

(21) Appl. No.: 10/633,793

(22) Filed: Aug. 4, 2003

(65) Prior Publication Data

US 2004/0056106 A1  Mar. 25, 2004

(30) Foreign Application Priority Data

Aug. 5, 2002  (JP) .................................... 2002-227492  
Jan. 28, 2003  (JP) .................................... 2003-019099

(51) Int. Cl.  
*B60H 1/20* (2006.01)

(52) U.S. Cl. ..................... 237/44; 165/10; 237/12.3 R  
(58) Field of Classification Search ................ 237/44, 237/75; 165/41, 42  
See application file for complete search history.

(56) References Cited

U.S. PATENT DOCUMENTS

| 3,289,423 A | | 12/1966 | Berner et al. |
| 5,605,190 A | * | 2/1997 | Strahle et al. ................ 165/10 |
| 5,957,193 A | * | 9/1999 | Kanada ....................... 165/10 |
| 6,041,618 A | * | 3/2000 | Patel et al. ................... 62/503 |
| 2004/0011501 A1 | | 1/2004 | Maruyama |

FOREIGN PATENT DOCUMENTS

| JP | 7-27430 | 5/1995 |
| JP | 10-86644 | 4/1998 |
| JP | A2001-128860 | 5/2001 |
| JP | 2002-309936 | 10/2002 |
| JP | 2004-001623 | 1/2004 |

* cited by examiner

*Primary Examiner*—Derek S. Boles  
(74) *Attorney, Agent, or Firm*—Harness, Dickey & Pierce, PLC

(57) ABSTRACT

A heat accumulator for vehicle use, attached to a vehicle, has a double tank structure composed of an outer tank and an inner tank, a space formed between the outer tank and the inner tank being maintained as a vacuum, the outer tank and the inner tank each have an opening on a bottom face, the opening of the outer tank and that of the inner tank are joined to each other at the entire peripheries of the openings, preventing means for preventing fatigue failure from starting at the joining portion being provided at a portion extending from the opening to at least a side of the outer tank.

20 Claims, 6 Drawing Sheets

HEAT ACCUMULATOR FOR VEHICLE USE

BACKGROUND OF THE INVENTION

1. Field of the Invention

The present invention relates to a heat accumulator for vehicle use. More particularly, the present invention relates to a heat accumulator, for vehicle use, the vibration resistance of which is enhanced.

2. Description of the Related Art

It is common to arrange an insulated tank-shaped heat accumulator, in which cooling water is stored, in a cooling water circuit so that cooling water at a high temperature, flowing out from a water-cooled internal combustion engine, can be introduced to the engine in the case of restarting the engine for the object of facilitating the warming-up of the engine. The heat accumulator is composed of an outer tank and inner tank. When a space formed between the outer tank and the inner tank is maintained as a vacuum, cooling water in the inner tank can be effectively heat-insulated. In order to conduct heat insulation more effectively, it is preferable that the contact area between the inner tank and the outer tank is as small as possible. Therefore, conventionally, the outer tank and the inner tank are connected with each other substantially only at a joining portion where the entire periphery of an opening of the outer tank and that of an opening of the inner tank are joined to each other.

In this connection, for example, the heat accumulator is attached at a side of the outer tank of the heat accumulator to a side member of a vehicle via a bracket by a cantilever system or a hanging system. Therefore, vibration generated while the vehicle is running is relatively easily transmitted to the heat accumulator via the side member and bracket. As a result, the inner tank vibrates inside the outer tank, and tensile stress is repeatedly generated in the joint portion between the tanks. Accordingly, fatigue failure starts at this joint portion and the cooling water leaks out from the inner tank. In other words, there is a possibility that the heat accumulator is damaged.

SUMMARY OF THE INVENTION

In order to solve the above problems, it is an object of the present invention to provide a heat accumulator, for vehicle use, the heat accumulating performance of which is high and the vibration resistance of which is enhanced.

According to an embodiment of the present invention, there is provided a heat accumulator, for vehicle use, having a double tank structure composed of an outer tank and an inner tank, a space formed between the outer tank and the inner tank being maintained as a vacuum, the outer tank and the inner tank respectively having an opening on a bottom face, the opening of the outer tank and that of the inner tank being joined to each other at the entire peripheries of the openings, preventing means for preventing fatigue failure from starting at the joining portion being provided at a portion extending from the opening to at least a side of the outer tank. Due to the foregoing, the vibration resistance of the heat accumulator can be enhanced while reducing weight or cost as comparing with the constitution of the tank, the entire of which is reinforced.

According to still another embodiment of the present invention, there is provided a heat accumulator, for vehicle use, in which the preventing means for preventing fatigue failure from starting at the joining portion being provided at the portion extending form the opening to at least a side of the outer tank. Due to the foregoing, a force of inertia generated by the vibration of the inner tank arranged inside the outer tank can be received by the portion of low rigidity provided in the outer tank. Therefore, the occurrence of a fatigue failure starting at the joining portion can be prevented and the vibration resistance of the heat accumulator can be enhanced.

According to another embodiment of the present invention, there is provided a heat accumulator, for vehicle use, in which the portion of low rigidity is an annular protruding portion protruding toward the inner tank side so that the annular protruding portion can surround the joining portion. Due to the foregoing, a force of inertia generated by the vibration of the inner tank arranged inside the outer tank can be received by an annular top portion of the annular protruding portion. Therefore, the intensity of stress generated in the joining portion of the outer and the inner tank can be reduced.

According to still another embodiment of the present invention, there is provided a heat accumulator, for vehicle use, in which the portion of low rigidity is an annular bellows portion extending so that the annular bellows portion can surround the joining portion. Due to the foregoing, a force of inertia generated by the vibration of the inner tank arranged inside the outer tank can be received by a plurality of annular top portions of the annular bellows portion. Therefore, the intensity of stress generated in the joining portion of the outer and the inner tank can be reduced.

According to still another embodiment of the present invention, there is provided a heat accumulator, for vehicle use, in which the portion of low rigidity is an annular thin portion extending so that the annular thin portion can surround the joining portion. Due to the foregoing, a force of inertia generated by the vibration of the inner tank arranged inside the outer tank can be received by an annular thin portion. Therefore, the intensity of stress generated in the joining portion of the outer and the inner tank can be reduced.

According to still another embodiment of the present invention, there is provided a heat accumulator, for vehicle use, in which a heat accumulator use fluid passage is provided in the joining portion for allowing a heat accumulator use fluid to flow in and out from the inner tank, and a plug for sealing around the heat accumulator use fluid passage is inserted into the opening of the inner tank, the side of the outer tank is attached to a vehicle body of the vehicle via a bracket connected with the side, the preventing means for preventing fatigue failure from starting at the joining portion, provided at the portion extending form the opening to at least a side of the outer tank, is comprised of a connecting member connecting the plug and the outermost circumferential portion of the bottom face of the outer tank. Due to the foregoing, when a portion of the outer tank close to the bracket and the plug arranged in the joining portion are connected with each other, substantially the same vibration as that transmitted from the vehicle body to the side of the outer tank via the bracket can be transmitted to the plug and the inner tank via the connecting member, that is, the vibration of the outer tank and that of the inner tank can be substantially synchronized with each other and the amplitude of the vibration of the inner tank arranged in the outer tank can be reduced. Therefore, it is possible to reduce the intensity of stress generated in the joining portion of the outer and the inner tank. Accordingly, the occurrence of a fatigue failure starting from the joining portion can be prevented, and the vibration resistance of the heat accumulator can be enhanced.

According to still another embodiment of the present invention, there is provided a heat accumulator, for vehicle use, in which a heat accumulator use fluid passage is provided in the joining portion for allowing a heat accumulator use fluid to flow in and out from the inner tank, and a plug for sealing around the heat accumulator use fluid passage is inserted into the opening of the inner tank, the side of the outer tank is attached to a vehicle body of the vehicle via a bracket connected with the side, the preventing means for preventing fatigue failure from starting at the joining portion, provided at the portion extending form the opening to at least a side of the outer tank, is comprised of a connecting member connecting the plug and a side of the outer tank. Due to the foregoing, when a portion of the outer tank closer to the bracket and the plug arranged in the joining portion are connected with each other, the synchronization of the vibration of the outer tank with that of the inner tank can be further enhanced. Therefore, it is possible to reduce an intensity of stress generated in the joining portion of the outer and the inner tank, and the vibration resistance of the heat accumulator can be further enhanced.

According to still another embodiment of the present invention, there is provided a heat accumulator, for vehicle use, in which a heat accumulator use fluid passage is provided in the joining portion for allowing a heat accumulator use fluid to flow in and out from the inner tank, and a plug for sealing around the heat accumulator use fluid passage is inserted into the opening of the inner tank, the side of the outer tank is attached to a vehicle body of the vehicle via a bracket connected with the side, the preventing means for preventing fatigue failure from starting at the joining portion, provided at the portion extending form the opening to at least a side of the outer tank, is comprised of a connecting member connecting the plug and the bracket. Due to the foregoing, when the plug in the joining portion is directly connected with the bracket, the synchronization of the vibration of the outer tank with the vibration of the inner tank can be further enhanced. Therefore, it is possible to reduce the intensity of stress generated in the joining portion of the outer and the inner tank, and the vibration resistance of the heat accumulator can be further enhanced.

According to still another embodiment of the present invention, there is provided a heat accumulator, for vehicle use, in which a heat accumulator use fluid passage is provided in the joining portion for allowing a heat accumulator use fluid to flow in and out from the inner tank, and a plug for sealing around the heat accumulator use fluid passage is inserted into the opening of the inner tank, the side of the outer tank is attached to a vehicle body of the vehicle via a bracket connected with the side, the preventing means for preventing fatigue failure from starting at the joining portion, provided at the portion extending form the opening to at least a side of the outer tank, is provided on annular portions on the bottom faces of the outer and inner tank and comprised of portion being inclined upward from the inner circumferential edge to the outer circumferential edge, the inclination angle of the portion, with respect to the horizon, being substantially set in a range from 10° to 50°. Due to the foregoing, when the annular portion of each tank is inclined, the intensity of stress generated in the tank is reduced and the vibration resistance of the heat accumulator can be enhanced. On the other hand, when an upper limit of the inclination angle is restricted, the tank capacity can be increased and the performance of the heat accumulator can be enhanced.

According to still another embodiment of the present invention, there is provided a heat accumulator, for vehicle use, in which the inclination angle of the annular portion of the outer tank is substantially set in a range from 20° to 30°. Due to the foregoing, the intensity of stress generated in the outer tank can be further reduced and the vibration resistance of the heat accumulator can be further enhanced. Furthermore, the capacity of the inner tank can be increased and the performance of the heat accumulator can be enhanced.

According to still another embodiment of the present invention, there is provided a heat accumulator, for vehicle use, in which the inclination angle of the annular portion of the outer tank is substantially set at 25°. Due to the foregoing, the inclination angle of the outer tank can be specified at a specific angle at which minimization of stress generated in the outer tank and maximization of the tank capacity can be made to be compatible with each other.

According to still another embodiment of the present invention, there is provided a heat accumulator, for vehicle use, in which the inclination angle of the annular portion of the inner tank is substantially set in a range from 20° to 30°. Due to the foregoing, the intensity of stress generated in the inner tank can be further reduced, and the vibration resistance of the heat accumulator can be further enhanced. Furthermore, the capacity of the inner tank can be increased and the performance of the heat accumulator can be enhanced.

According to still another embodiment of the present invention, there is provided a heat accumulator, for vehicle use, in which the inclination angle of the annular portion of the inner tank is substantially set at 25°. Due to the foregoing, the inclination angle of the inner tank can be specified at a specific angle by which minimization of stress generated in the inner tank and maximization of the tank capacity can be made to be compatible with each other.

According to still another embodiment of the present invention, there is provided a heat accumulator, for vehicle use, in which at least one portion of each of the annular portions of the outer and the inner tank has a conical portion. Due to the foregoing, the annular portion on the bottom face of the tank is formed into a conical shape and the tank can be easily manufactured.

According to still another embodiment of the present invention, there is provided a heat accumulator, for vehicle use, in which a cross section of the annular portion of each of the outer and the inner tank is curved. Due to the foregoing, a cross section of the annular portion on the bottom face of the tank is curved. Therefore, an intensity of stress generated in the annular portion can be reduced.

According to still another embodiment of the present invention, there is provided a heat accumulator, for vehicle use, in which an inclination angle of the annular portion on the bottom face of each of the outer and the inner tank is gradually increased from the inner circumferential edge of the annular portion to the outer circumferential edge. Due to the foregoing, the intensity of stress generated in the annular portion on the bottom face of the tank can be further reduced.

According to still another embodiment of the present invention, there is provided a heat accumulator, for vehicle use, in which an inclination angle of the annular portion of the inner tank is substantially larger than an inclination angle of the annular portion of the outer tank by a predetermined angle smaller than 30°. Due to the foregoing, the intensity of stress generated in the inner tank is maintained lower than an intensity of stress generated in the outer tank at all times. Therefore, it is possible to prevent the inner tank from being damaged by a fatigue failure ahead of the outer tank, that is, it is possible to prevent the cooling water from leaking out which is caused when the inner tank is damaged by fatigue failure.

According to still another embodiment of the present invention, there is provided a heat accumulator, for vehicle use, in which the predetermined angle is substantially 5°. Due to the foregoing, the inclination angles of the annular portions on the bottom faces of the outer and the inner tank can be further specified.

According to still another embodiment of the present invention, there is provided a heat accumulator, for vehicle use, in which a heat accumulator use fluid passage is provided in the joining portion for allowing a heat accumulator use fluid to flow in and out from the inner tank, and a plug for sealing around the heat accumulator use fluid passage is inserted into the opening of the inner tank, the side of the outer tank is attached to a vehicle body of the vehicle via a bracket connected with the side, the portion extending form the opening to at least a side of the outer tank at which the preventing means for preventing fatigue failure from starting at the joining portion is provided, is a path through which vibration of the vehicle is transmitted to the joining portion.

The present invention may be more fully understood from the description of the preferred embodiments of the invention set forth below, together with the accompanying drawings.

DESCRIPTION OF THE PREFERRED EMBODIMENTS

Referring to the accompanying drawings, embodiments of the present invention will be explained in detail as follows.

Figure 1:
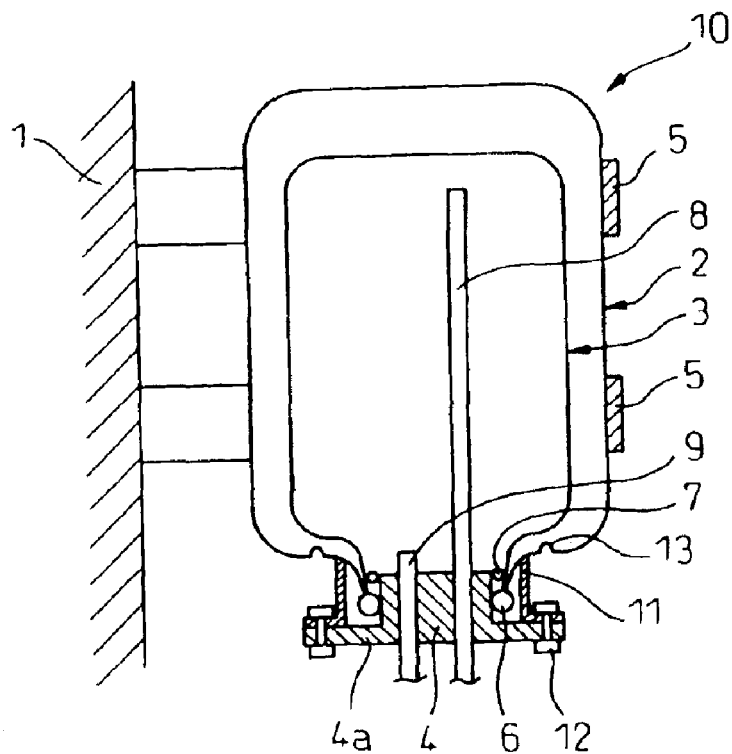
FIG. 1 is a sectional view showing a heat accumulator for vehicle use of the first embodiment of the present invention.

First, explanations will be made into the first embodiment of the present invention. FIG. 1 is a sectional view showing a heat accumulator 10, for vehicle use, of the first embodiment of the present invention. The heat accumulator 10 has a double tank structure composed of the outer tank 2 and the inner tank 3. Each of the outer tank 2 and the inner tank 3 has an opening on the bottom face. These openings of the outer tank 2 and the inner tank 3 are joined to each other at the entire circumferences by means of welding and form the joining portion 6. The outer tank 2 and the inner tank 3 are contacted with each other only by this joining portion 6, and a space formed between the outer tank 2 and the inner tank 3 is maintained as a vacuum. Therefore, it is guaranteed that the heat of the cooling water stored in the inner tank 3 is hardly transmitted to the outer tank 2.

Next, the plug 4 attached to the inner tank 3 will be explained below. In order to seal an opening portion of the inner tank 3, the plug 4 is press-fitted into the inside of the joining portion 6 of the heat accumulator 10, so that a portion between the entire circumference of the joining portion 6 and the inner tank 3 can be sealed. In order to conduct sealing more effectively, O-ring 7 is inserted between the inner tank 3 and the plug 4. In order to allow cooling water flow into and from the inner tank 3, a hole into which the flow-in pipe 8 is penetrated, which is a portion of the cooling water circuit of the internal combustion engine, and a hole into which the flow-out pipe 9 is penetrated, which is a portion of the cooling water circuit, are formed in the plug 4. In order to connect the plug 4 with the outer tank 3 by the connecting member 11, the plug 4 has a flange portion 4a having holes used for fastening the connecting member 11 by the bolts 12. The connecting member 11 is fastened to the plug 4 by the bolts and joined to the bottom face of the outer tank 2, for example, by means of welding.

Next, a method of attaching the heat accumulator 10 will be explained as follows. In order to attach the heat accumulator 10 to the vehicle body, the bracket 5 is used. The bracket 5 is composed in such a manner that one end portion of the bracket 5 surrounds the entire circumferential edge of the outer tank 2 so as to hold the heat accumulator 10 and the other end portion is attached to the side member of the vehicle body 1. As shown in FIG. 1, in this embodiment, the heat accumulator 10 is attached to the vehicle body, via the two brackets 5, by a cantilever system.

Next, the behavior of the conventional heat accumulator for vehicle use in the case of vibration will be explained below. When a vehicle is running, each portion of the vehicle is mainly vibrated due to the tire wheels moving upward and downward under the influence of the irregularities in a road surface. Especially, the vibration is transmitted to the heat accumulator for vehicle use via the side member and the bracket 5. In this case, as described before, as the outer tank 2 and the inner tank 3 of the heat accumulator 10 are joined to each other only by the joining portion 6, the vibration rigidity of the heat accumulator 10 is low. Accordingly, the inner tank 3 is vibrated inside the outer tank 2. As a result, tensile stress is repeatedly generated in the joining portion 6 of the outer tank 2 and the inner tank 3. The intensity of this tensile stress can exceed the fatigue limit at which a fatigue failure is caused. Therefore, a fatigue failure is caused when the number of repetition of the tensile stress reaches a predetermined value, and the cooling water leaks out from the inner tank 3, that is, there is a possibility that the heat accumulator 10 is damaged. In other words, it is a problem that the vibration resistance of the conventional heat accumulator 10 is low.

On the other hand, according to the present invention, in the first to the third embodiment, there is provided a low rigidity portion, the rigidity of which is lower than that of the joining portion 6 and the other portion on the bottom face of the outer tank, in the outer tank 2. In the fourth to the sixth embodiment, a portion in the neighborhood of the bracket 5 and the plug 4 arranged in the joining portion 6 are connected with each other so that the vibration of the outer tank 2 and that of the inner tank 3 are substantially synchronized with each other so that an intensity of the tensile stress generated in the joining portion 6 can be maintained to be lower than the fatigue limit at all times. Due to the foregoing, according to the present invention, it is possible to prevent the joining portion 6 of the heat accumulator 10 from being broken by a fatigue failure, that is, it is possible to enhance the vibration resistance of the heat accumulator 10. In this connection, when the constitution of the first to the third embodiment and the constitution of the fourth to the sixth embodiment are combined with each other, it is possible to provide a synergistic effect.

At first, the first embodiment will be explained below. As shown in FIG. 1, in this embodiment, there is provided an annular protruding portion 13, which is a low rigidity portion, on the bottom face of the outer tank 2 in such a manner that the annular protruding portion 13 surrounds the joining portion 6. As this annular protruding portion 13 of low rigidity is provided, while a vehicle is running, a force of inertia generated by the vibration of the inner tank 3 arranged in the outer tank 2 concentrates on an annular top portion of the annular protruding portion 13. Therefore, the intensity of the force given to the joining portion 6 can be reduced, that is, the intensity of the stress given to the joining portion 6 can be reduced.

Figure 2:
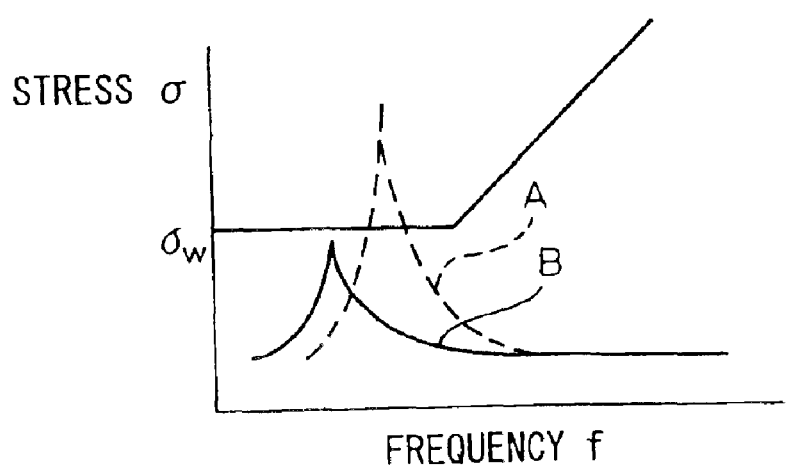
FIG. 2 is a graph showing a relation between the vibration frequency f of an inner tank and the tensile stress a of a joining portion.

Referring to FIG. 2, a reduction of the intensity of the stress given to the joining portion 6 will be explained below. FIG. 2 is a graph showing a relation between the frequency f of the vibration of the inner tank 3 and the tensile stress $\sigma$ given to the joining portion 6. In the conventional heat accumulator, as shown by the stress curve A expressed by a dotted line, the stress $\sigma$ given to the joining portion 6 exceeds the fatigue limit $\sigma_w$ in a specific frequency region. Accordingly, there is a possibility of the occurrence of a fatigue failure. However, in the heat accumulator of the present invention, as a force is concentrated at the low rigidity portion, the stress curve B expressed by a solid line can be reduced to values lower than the fatigue limit $\sigma_w$ in an arbitrary frequency region. Therefore, it is possible to prevent the occurrence of a fatigue failure starting from the joining portion. Even when a fatigue failure is caused at the starting point of the joining portion, it is guaranteed that the joining portion 6 is kept sealed by the plug 4. In other words, it is guaranteed that the cooling water stored in the inner tank 3 does not leak out from the inner tank 3. Therefore, the vibration resistance of the heat accumulator can be enhanced.

Figure 3:
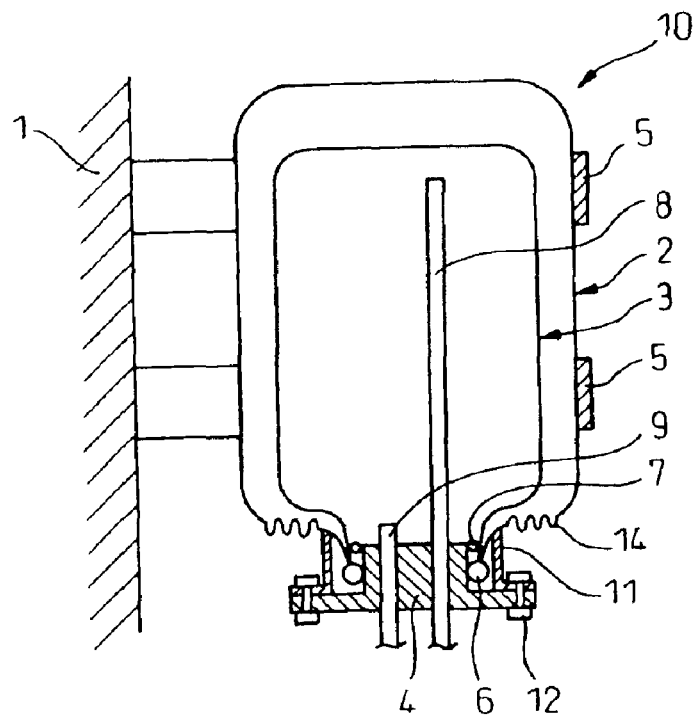
FIG. 3 is a sectional view showing a heat accumulator for vehicle use of the second embodiment of the present invention.

Next, the second embodiment will be explained below. FIG. 3 is a sectional view of the heat accumulator, for vehicle use, of the second embodiment of the present invention. As shown in FIG. 3, in the second embodiment, there is provided an annular bellows portion 14, which is a low rigidity portion, on the bottom face of the outer tank 2, in such a manner that the annular bellows portion 14 extends to surround the joining portion 6. As the annular bellows portion 14 of a low rigidity is provided, in the same manner as that of the first embodiment, while a vehicle is running, the force of inertia generated by the vibration of the inner tank 3 arranged in the outer tank 2 is concentrated at a plurality of annular top portions of the annular bellows portion 14. Therefore, the intensity of the stress given to the joining portion 6 can be reduced. Accordingly, the vibration resistance of the heat accumulator can be enhanced.

Figure 4:
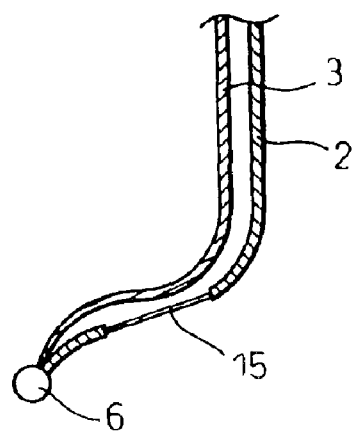
FIG. 4 is an enlarged sectional view of an outer tank portion of a heat accumulator for vehicle use of the third embodiment of the present invention.

Next, the third embodiment will be explained below. FIG. 4 is an enlarged sectional view of the outer tank of the heat accumulator, for vehicle use, of the third embodiment of the present invention. As shown in FIG. 4, in the third embodiment, there is provided a low rigidity portion which is formed into an annular thin portion 15 on the bottom face of the outer tank 2 in such a manner that the annular thin portion 15 surrounds the joining portion 6. The annular thin portion 15 is acutely or bluntly depressed on the inner or the outer face of the outer tank 2 or on both the inner and the outer face of the outer tank 2. Due to the above structure, a force of inertia generated by the vibration of the inner tank 3 arranged in the outer tank 2 is concentrated on the annular thin portion 15. Therefore, the intensity of the stress given to the joining portion 6 can be reduced, and the vibration resistance of the heat accumulator can be enhanced.

Figure 5:
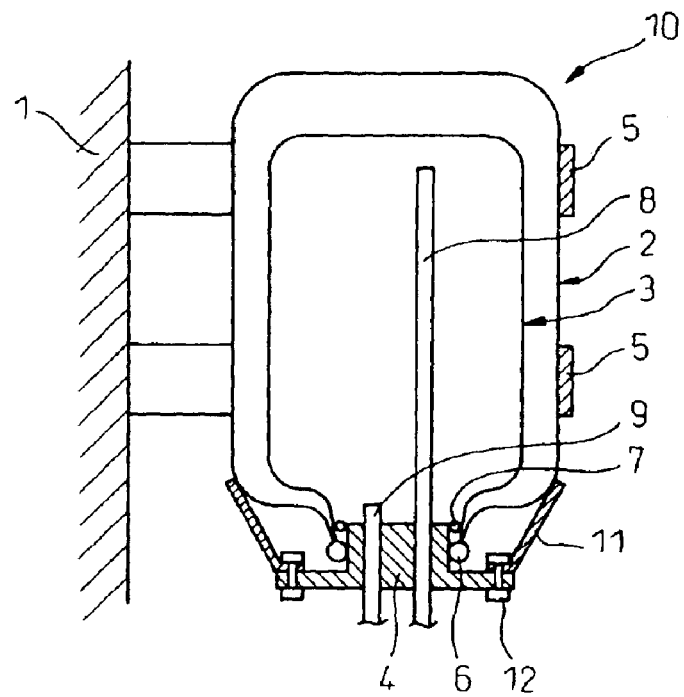
FIG. 5 is a sectional view showing a heat accumulator for vehicle use of the fourth embodiment of the present invention.

Next, the fourth embodiment will be explained below. FIG. 5 is a sectional view of the heat accumulator, for vehicle use, of the fourth embodiment of the present invention. In this embodiment, the vibration generated in the inner tank 3 arranged in the outer tank 2 is reduced when the vibration of the outer tank 2 and that of the inner tank 3 are synchronized with each other. In this embodiment, as shown in FIG. 5, the connecting member 11 connects the plug 4 with the outermost circumferential portion on the bottom face of the outer tank 2. Due to the above structure, substantially the same vibration, as the vibration transmitted from the vehicle body 1 to the outer tank 2 via the bracket 5, is transmitted to the plug 4 arranged in the joining portion 6 via the connecting member 11, that is, substantially the same vibration, as the vibration transmitted from the vehicle body to the outer tank 2 via the bracket 5, is transmitted to the inner tank 3. That is, the vibration of the outer tank 2 and that of the inner tank 3 can be substantially synchronized with each other, and the vibration of the inner tank 3 arranged in the outer tank 2 can be reduced and the vibration resistance of the heat accumulator can be enhanced. In this connection, this connecting member 11 may be formed into either a circular truncated cone member, which covers the entire circumference of the outer tank 2, or a plurality of linear members.

Figure 6:
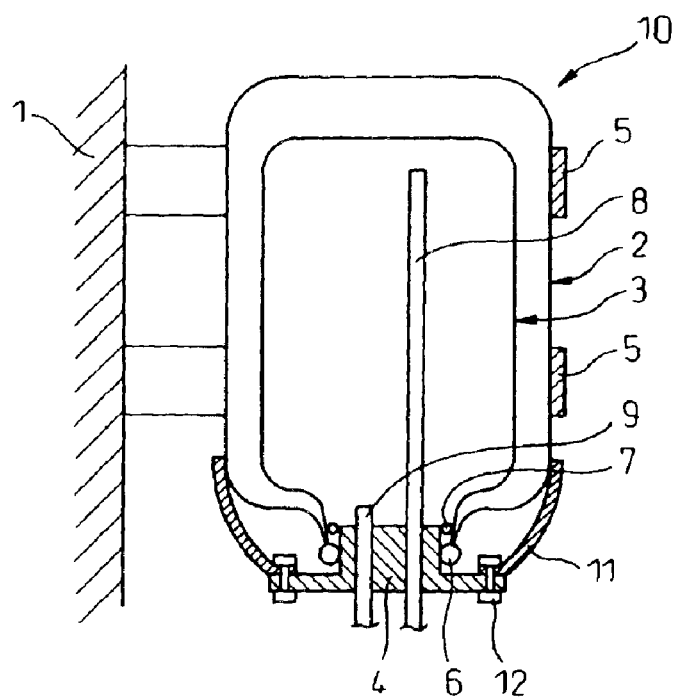
FIG. 6 is a sectional view showing a heat accumulator for vehicle use of the fifth embodiment of the present invention.

Next, the fifth embodiment will be explained below. FIG. 6 is a sectional view of the heat accumulator, for vehicle use, of the fifth embodiment of the present invention. As shown in FIG. 6, the structure of the fifth embodiment is substantially the same as that of the fourth embodiment. The only different point is that the connecting member 11 is connected to the side of the outer tank 2. When the connecting member 11 is connected with a portion of the outer tank 2 closer to the bracket 5, the synchronization property of the outer tank 2 with the inner tank 3 can be further enhanced and the vibration of the inner tank 3 arranged in the outer tank 2 can be further reduced. Therefore, the vibration resistance of the heat accumulator can be further enhanced.

Figure 7:
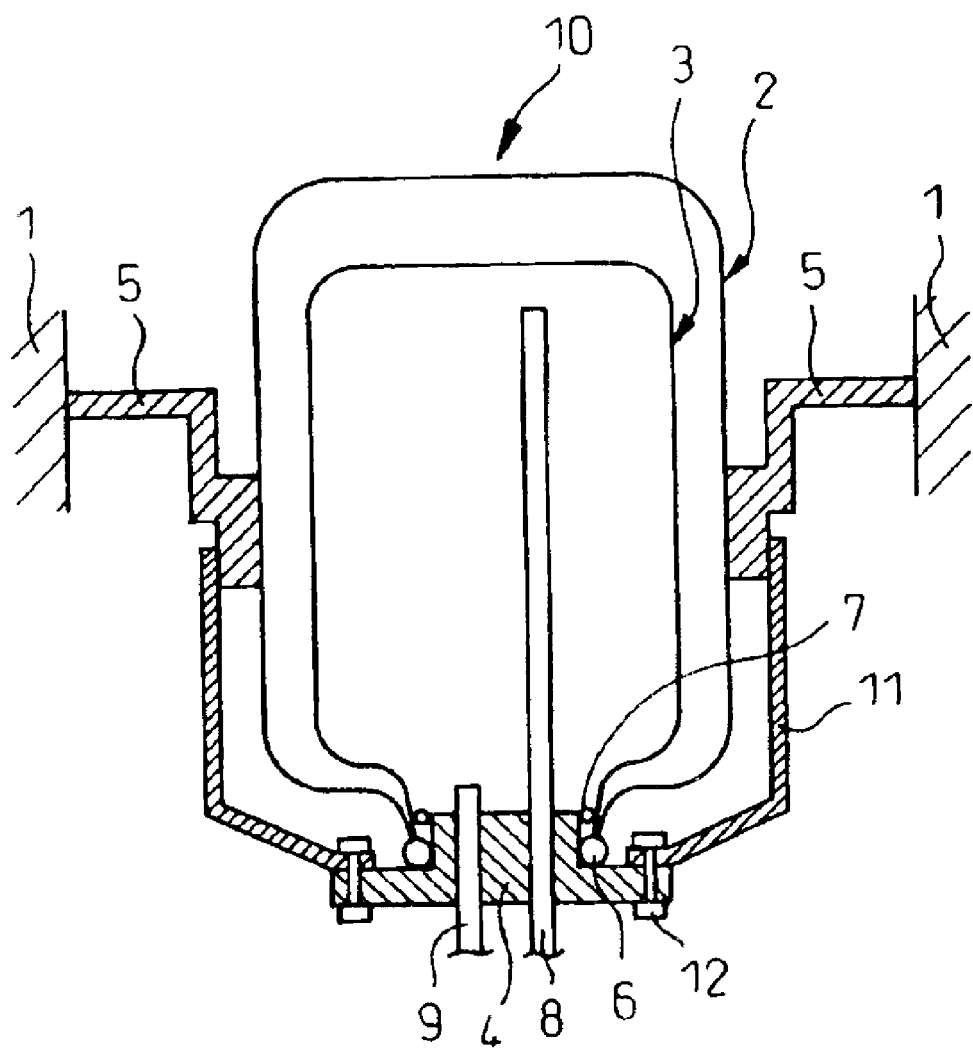
FIG. 7 is a sectional view showing a heat accumulator for vehicle use of the sixth embodiment of the present invention.

Next, the sixth embodiment will be explained below. FIG. 7 is a sectional view of the heat accumulator, for vehicle use, of the sixth embodiment of the present invention. As shown in FIG. 7, in this embodiment, the heat accumulator 10 is hung from the vehicle body via the bracket 5 connected with the side of the outer tank 2. The plug 4 inserted into the joining portion 6 is directly connected to the bracket 5 by the connecting member 11. As described above, as the plug 4 arranged in the joining portion 6 is directly connected with the bracket 5, the synchronization property of the vibration of the outer tank 2 with that of the inner tank 3 can be further enhanced and the vibration of the inner tank 3 arranged in the outer tank 2 can be further reduced. Therefore, the vibration resistance of the heat accumulator can be enhanced.

Figure 8:
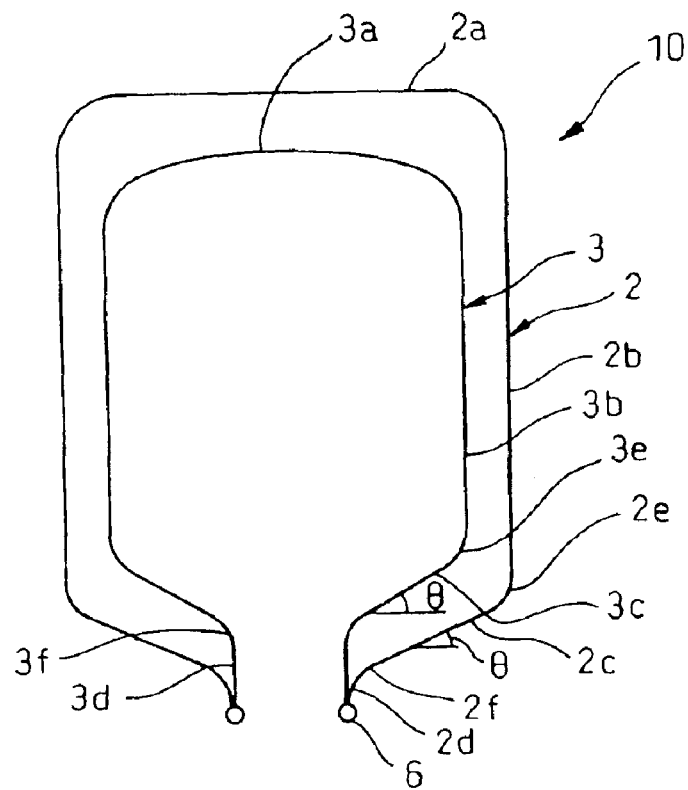
FIG. 8 is a sectional view showing a heat accumulator for vehicle use of the seventh embodiment of the present invention.
Figure 9:
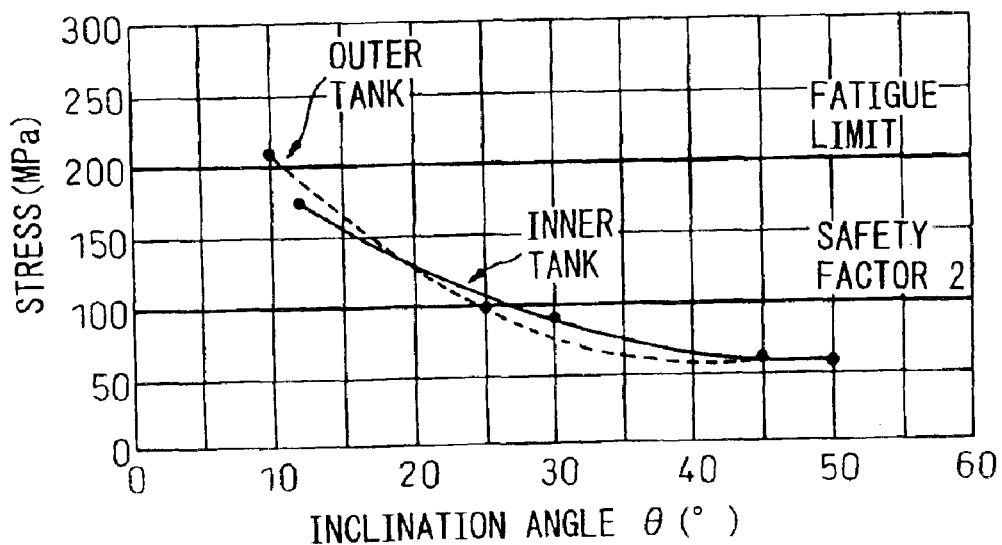
FIG. 9 is a graph showing a relation between an inclination angle of an annular portion on a bottom face of each tank and an intensity of stress generated in each tank.

Finally, the seventh embodiment will be explained below. FIG. 8 is a sectional view of the heat accumulator for vehicle use of the seventh embodiment of the present invention. In the heat accumulator for vehicle use of this embodiment, only the outer tank 2 and the inner tank 3 are different from those of the heat accumulators for vehicle use shown in the first to the sixth embodiment. Therefore, only the outer tank 2 and the inner tank 3 are shown in FIG. 8. In this embodiment, when the rigidity of the outer tank 2 and the inner tank 3 is enhanced, the vibration resistance of the heat accumulator is enhanced. As shown in FIG. 8, the outer tank 2 and the inner tank 3 are respectively provided with upper faces 2a, 3a, side faces 2b, 3b and bottom faces. These bottom faces respectively include: annular portions 2c, 3c having outer and inner circumferential edges adjacent to the side faces 2b, 3b; and cylindrical portions 2d, 3d having openings at the forward end portions which protrude downward from the inner circumferential edges of the annular portions 2c, 3c. In the conventional structure, the annular portion 2c is horizontal. Therefore, when the vibration is transmitted to the heat accumulator 10 while a vehicle is running, there is a possibility that the annular portions 2c, 3c are vibrated in such a manner that portions 2c, 3c are undulated. However, in this embodiment, each of the annular portions 2c, 3c is formed into a shape which is inclined upward from the inner circumferential edge to the outer circumferential edge, that is, each of the annular portions 2c, 3c is formed into a shape which is inclined upward to the outside in the radial direction. Due to the above structure, referring to the graph of FIG. 9 showing a relation between the inclination angle θ of the annular portion 2c, 3c with respect to the horizon and the stress generated in the tank, as shown by a dotted line of the outer tank and also shown by a solid line of the inner tank, when the inclination angle θ is increased, an intensity of the stress generated in each tank is decreased. That is, when the inclination angle θ is not less than 10°, an intensity of the stress generated in the tank is lower than the fatigue limit. Therefore, it is guaranteed that a fatigue failure is not caused in the tanks 2, 3. As described above, when the annular portions 2c, 3c are inclined, it is possible to enhance the rigidity of the annular portions 2c, 3c and it is also possible to enhance the vibration resistance of the tanks 2, 3, that is, it is also possible to enhance the vibration resistance of the heat accumulator 10. In this connection, in order to further reduce an intensity of the stress, the annular boundary portion 2f between the annular portion 2c and the cylindrical portion 2d and the annular boundary portion 2e between the annular portion 2c and the side face 2b may be formed into a curved cross section having a relatively large radius of curvature. In this connection, the relation between the boundary portions 3f, 3e and the cylindrical portion 3d or the like of the inner tank 3 is the same as the above relation of the outer tank 2.

Figure 10:
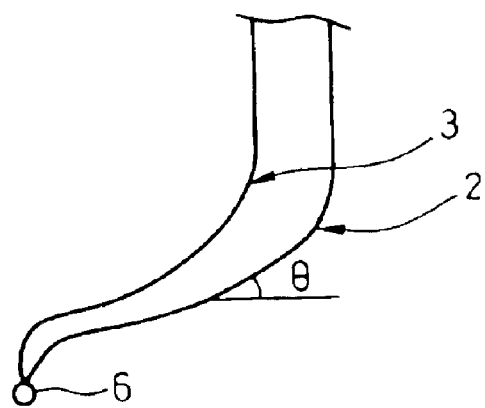
FIG. 10 is a sectional view showing a tank of a heat accumulator for vehicle use of the seventh embodiment of the present invention.

The conical annular portions 2c, 3c are advantageous in that they can be relatively easily manufactured. However, the shape of the annular portion 2c, 3c is not limited to the conical shape in which the inclination angle θ is maintained constant from the inner circumferential edge to the outer circumferential edge but a cross section of the annular portion may be formed into a curved shape in which a radius of curvature of the annular portion 2c, 3c is increased so that the intensity of the stress can be reduced. For example, as shown in FIG. 10, it is possible to adopt a shape in which the inclination angle θ is gradually increased from the inner circumferential edge to the outer circumferential edge as shown in FIG. 10. When the annular portions 2c, 3c are greatly inclined as described above, it is possible to provide an advantage that the stress generated in the annular portions 2c, 3c can be further reduced.

Figure 11:
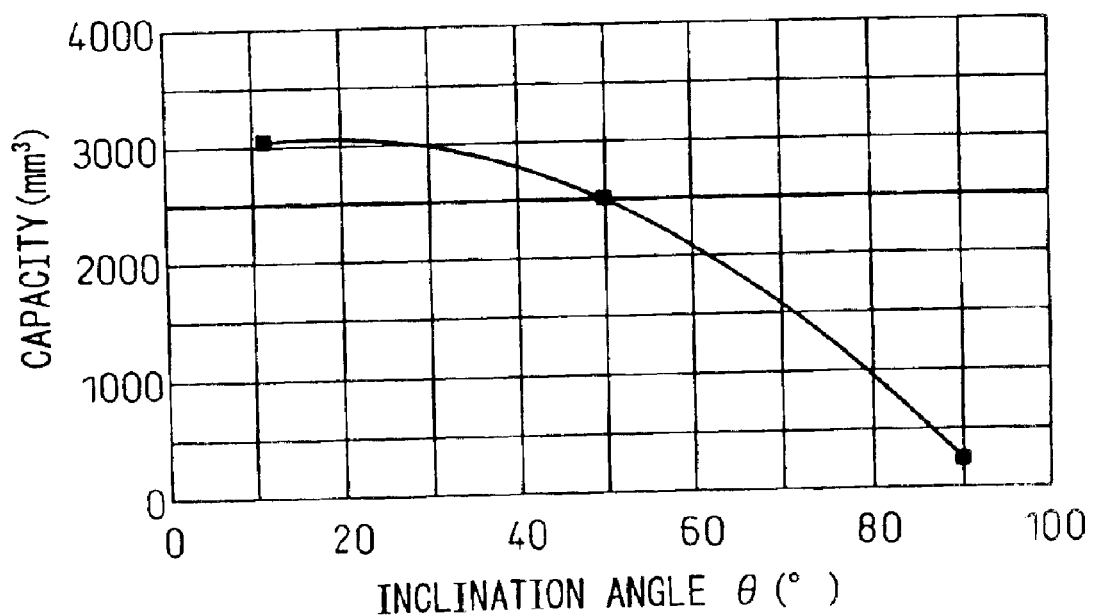
FIG. 11 is a graph showing a relation between the inclination angle of an annular portion on a bottom face of an inner tank with respect to the horizon and the inner tank capacity.

On the other hand, when the inclination angle θ of each annular portion 2c, 3c of each tank 2, 3 is remarkably increased, the capacity of the inner tank 3 for storing the cooling water is disadvantageously decreased and the performance of the heat accumulator is restricted. Therefore, it is necessary to determine the maximum value of the inclination angle θ to satisfy a necessary capacity, referring to the graph of FIG. 11 showing a relation between the inclination angle θ and the tank capacity. In this embodiment, the maximum value of the inclination angle θ with respect to the necessary capacity 2500 mm$^3$ is determined to be 50°. Due to the foregoing, from the viewpoint of ensuring the mechanical strength and the capacity of the tank 2, 3, the inclination angle θ of the annular portion 2c, 3c can be decided in the range from 10 to 50°.

In order to enhance the mechanical strength and the capacity of the tank 2, 3, the generated stress is reduced so that the safety factor can be about 2. Further, in order to increase the capacity of the tank 2, 3, the inclination angle θ of the annular portion 2c, 3c can be preferably decided to be about 20° to 30°. Further, in order to increase the capacity of the tank 2, 3, the inclination angle θ of the annular portion 2c, 3c can be preferably decided to be about 20° to 30°. Further, the inclination angle θ can be more preferably decided to be about 25°.

Next, the fail-safe structure of the heat accumulator for vehicle use of the present invention will be explained below. As described above, when the annular portions 2c, 3c of the tanks 2, 3 are inclined, it is guaranteed that the occurrence of a fatigue failure of the tanks 2, 3 is prevented. In case of the occurrence of a fatigue failure of the tanks 2, 3, it is more preferable that the heat accumulator is composed of a fail-safe structure. In order to accomplish the fail-safe structure, while consideration is given to the fact that the degree of danger, in which the outer tank 2 is damaged by a fatigue failure ahead of the inner tank 3 and a vacuum state can not be maintained between the outer tank 2 and the inner tank 3, is remarkably lower than the degree of danger in which the inner tank 3 is damaged ahead of the outer tank 2 and the cooling water leaks out from the inner tank 3, even if a fatigue failure is caused in the heat accumulator, it is designed that the outer tank 2 is damaged ahead of the inner tank 3. Therefore, an intensity of the stress generated in the inner tank 3 is designed to be lower than an intensity of the stress generated in the outer tank 2. Referring to FIG. 9, in the range of the inclination angle θ from 10° to 50°, the inclination angle θ of the outer tank 2 is made to be larger than the inclination angle θ of the inner tank 3 by a predetermined angle smaller than 30°. It is preferable that the inclination angle θ of the outer tank 2 is made to be larger than the inclination angle θ of the inner tank 3 by 50. Due to the foregoing, even if the outer tank 2 is damaged by a fatigue failure, there is no possibility that the cooling water will leak out from the inner tank 3, and a signal that a vacuum state between the outer tank 2 and the inner tank 3 cannot be maintained is displayed on an instrument panel of the vehicle. Therefore, a driver can recognize that the heat accumulator has become out of order. Accordingly, the driver can repair it.

While the invention has been described by reference to specific embodiments chosen for purposes of illustration, it should be apparent that numerous modifications could be made thereto by those skilled in the art without departing from the basic concept and scope of the invention.

What is claimed is:

1. A heat accumulator, for vehicle use, attached to a vehicle and having a double tank structure composed of an outer tank and an inner tank, a space formed between the outer tank and the inner tank being maintained as a vacuum, the outer tank and the inner tank each having an opening on a bottom face, the opening of the outer tank and that of the inner tank being joined to each other at the entire peripheries of the openings to form a joining portion, preventing means for preventing fatigue failure from starting at said joining portion being provided at a portion extending between said joining portion and an outer wall of said outer tank.

2. A heat accumulator, for vehicle use, according to claim 1, wherein said preventing means comprises a portion of low rigidity being provided at said portion extending between said joining portion and said outer wall of said outer tank.

3. A heat accumulator, for vehicle use, according to claim 2, wherein the portion of low rigidity is an annular protruding portion protruding toward the inner tank so that the annular protruding portion can surround the joining portion.

4. A heat accumulator, for vehicle use, according to claim 2, wherein the portion of low rigidity is an annular bellows portion extending so that the annular bellows portion can surround the joining portion.

5. A heat accumulator, for vehicle use, according to claim 2, wherein the portion of low rigidity is an annular thin portion extending so that the annular thin portion can surround the joining portion.

6. A heat accumulator, for vehicle use, according to claim 1, wherein a heat accumulator use fluid passage is provided in said joining portion for allowing a heat accumulator use fluid to flow in and out from said inner tank, and a plug for sealing around said heat accumulator use fluid passage is inserted into said opening of said inner tank, said outer wall of said outer tank is attached to a vehicle body of said vehicle via a bracket connected with said outer wall, said preventing means is comprised of a connecting member connecting said plug and the outermost circumferential portion of the bottom face of the outer tank.

7. A heat accumulator, for vehicle use, according to claim 1, wherein a heat accumulator use fluid passage is provided in said joining portion for allowing a heat accumulator use fluid to flow in and out from said inner tank, and a plug for sealing around said heat accumulator use fluid passage is inserted into said opening of said inner tank, said outer wall of said outer tank is attached to a vehicle body of said vehicle via a bracket connected with said outer wall, said preventing means is comprised of a connecting member connecting said plug and the outer wall of said outer tank.

8. A heat accumulator, for vehicle use, attached to a vehicle and having a double tank structure composed of an outer tank and an inner tank, a space formed between the outer tank and the inner tank being maintained as a vacuum, the outer tank and the inner tank each having an opening on a bottom face, the opening of the outer tank and that of the inner tank being joined to each other at the entire peripheries of the openings to form a joining portion, preventing means for preventing fatigue failure from starting at said joining portion being provided at a portion extending from said opening to at least a side of said outer tank, wherein a heat accumulator use fluid passage is provided in said joining portion for allowing a heat accumulator use fluid to flow in and out from said inner tank, and a plug for sealing around said heat accumulator use fluid passage is inserted into said opening of said inner tank, said side of said outer tank is attached to a vehicle body of said vehicle via a bracket connected with said side, said preventing means for preventing fatigue failure from starting at said joining portion, provided at said portion extending from said opening to at least a side of said outer tank, is comprised of a connecting member connecting said plug and said bracket.

9. A heat accumulator, for vehicle use, according to claim 1, wherein a heat accumulator use fluid passage is provided in said joining portion for allowing a heat accumulator use fluid to flow in and out from said inner tank, and a plug for seating around said heat accumulator use fluid passage is inserted into said opening of said inner tank, said outer wall of said outer tank is attached to a vehicle body of said vehicle via a bracket connected with said outer wall, said preventing means is provided on annular portions on bottom faces of the outer and inner tank and comprised of a portion being inclined upward from the inner circumferential edge to the outer circumferential edge, the inclination angle of the portion, with respect to the horizon, being substantially set in a range from 10° to 50°.

10. A heat accumulator for vehicle use according to claim 9, wherein the inclination angle of the annular portion of the outer tank is substantially set in a range from 20° to 30°.

11. A heat accumulator for vehicle use according to claim 10, wherein the inclination angle of the annular portion of the outer tank is substantially set at 25°.

12. A heat accumulator for vehicle use according to claim 9, wherein the inclination angle of the annular portion of the inner tank is substantially set in a range from 20° to 30°.

13. A heat accumulator for vehicle use according to claim 12, wherein the inclination angle of the annular portion of the inner tank is substantially set at 25°.

14. A heat accumulator for vehicle use according to claim 9, wherein at least one portion of each of the annular portions of the outer and the inner tank has a conical portion.

15. A heat accumulator, for vehicle use, according to claim 9, wherein a cross section of the annular portion of each of the outer and the inner tank is curved.

16. A heat accumulator for vehicle use according to claim 15, wherein an inclination angle of each of the outer and the inner tank is gradually increased from the inner circumferential edge of the annular portion to the outer circumferential edge.

17. A heat accumulator, for vehicle use, according to claim 9, wherein an inclination angle of the inner tank is substantially larger than an inclination angle of the outer tank by a predetermined angle smaller than 30°.

18. A heat accumulator for vehicle use according to claim 17, wherein the predetermined angle is substantially 5°.

19. A heat accumulator, for vehicle use, according to claim 1, wherein a heat accumulator use fluid passage is provided in said joining portion for allowing a heat accumulator use fluid to flow in and out from said inner tank, and a plug for sealing around said heat accumulator use fluid passage is inserted into said opening of said inner tank, said outer wall of said outer tank is attached to a vehicle body of said vehicle via a bracket connected with said outer wall, said portion extending between said joining portion and the outer wall of said outer tank at which said preventing means for preventing fatigue failure from starting at said joining portion is provided, is a path through which vibration of said vehicle is transmitted to said joining portion.

20. A heat accumulator, for vehicle use, according to claim 1, wherein said preventing means for preventing fatigue from starting at said joining portion is provided at said portion extending from said opening to at least a side of said outer tank and at least one the outer surface of said outer tank.

* * * * *

UNITED STATES PATENT AND TRADEMARK OFFICE
CERTIFICATE OF CORRECTION

PATENT NO. : 6,994,268 B2
APPLICATION NO. : 10/633793
DATED : February 7, 2006
INVENTOR(S) : Kenichi Maruyama et al.

It is certified that error appears in the above-identified patent and that said Letters Patent is hereby corrected as shown below:

Col. 12, line 64, claim 20, delete "the"

Signed and Sealed this

First Day of August, 2006

JON W. DUDAS
*Director of the United States Patent and Trademark Office*